United States Patent
Dilts et al.

(10) Patent No.: US 9,442,895 B1
(45) Date of Patent: Sep. 13, 2016

(54) WEB-BASED PUBLISHING LAYOUT SPECIFICATION

(71) Applicant: LUCID SOFTWARE, INC, Draper, UT (US)

(72) Inventors: Benjamin N. Dilts, Spanish Fork, UT (US); Alma T. Madsen, Lehi, UT (US)

(73) Assignee: LUCID SOFTWARE, INC., South Jordan, UT (US)

( * ) Notice: Subject to any disclaimer, the term of this patent is extended or adjusted under 35 U.S.C. 154(b) by 682 days.

(21) Appl. No.: 13/721,560

(22) Filed: Dec. 20, 2012

(51) Int. Cl.
*G06F 17/20* (2006.01)
*G06F 17/21* (2006.01)

(52) U.S. Cl.
CPC ................... *G06F 17/211* (2013.01)

(58) Field of Classification Search
CPC . G06F 17/214; G06F 17/211; G06F 17/2217
See application file for complete search history.

(56) References Cited

U.S. PATENT DOCUMENTS

| | | | | |
|---|---|---|---|---|
| 5,832,530 A * | 11/1998 | Paknad | .............. | G06K 9/00463 715/235 |
| 6,678,688 B1 * | 1/2004 | Unruh | ................... | G06K 15/02 |
| 6,760,029 B1 * | 7/2004 | Phinney | ................. | G06K 15/02 345/468 |
| 7,237,193 B1 * | 6/2007 | Zaky | ..................... | G06F 17/212 715/205 |
| 7,840,891 B1 | 11/2010 | Yu et al. | | |
| 7,937,658 B1 * | 5/2011 | Lunde | .................. | G06F 17/214 715/256 |
| 2007/0024626 A1 * | 2/2007 | Kagle | .................. | G06F 17/214 345/467 |
| 2007/0055934 A1 | 3/2007 | Adamson, III | | |
| 2009/0254803 A1 | 10/2009 | Bayne | | |
| 2011/0252304 A1 | 10/2011 | Lemonik et al. | | |
| 2011/0271180 A1 * | 11/2011 | Lee | ....................... | G06F 17/214 715/269 |

OTHER PUBLICATIONS

International Search Report dated Mar. 31, 2014 as received in Application No. PCT/US2013/077121.
Written Opinion of the International Searching Authority dated Mar. 31, 2014 as received in Application No. PCT/US2013/077121.

* cited by examiner

*Primary Examiner* — Shahid Khan
(74) *Attorney, Agent, or Firm* — Maschoff Brennan (57) ABSTRACT

In an embodiment, a method of processing text at a client device in a web-based publishing solution is described. The method includes storing text for a document in a storage format. The method also includes generating a render format from the storage format. The method also includes generating metrics describing the render format. The method also includes rendering the document including the text to a display based at least on the generated metrics.

21 Claims, 9 Drawing Sheets

WEB-BASED PUBLISHING LAYOUT SPECIFICATION

FIELD

Some embodiments described herein generally relate to web-based publishing solutions.

BACKGROUND

Unless otherwise indicated herein, the materials described herein are not prior art to the claims in the present application and are not admitted to be prior art by inclusion in this section.

QUARKXPRESS and ADOBE INDESIGN are both examples of desktop publishing software that allows users to create electronic and printed materials using page layout on a personal computer. Desktop publishing software can be used to produce electronic and printed literature with attractive layouts and typographic quality comparable to traditional typography and printing. This technology allows individuals, businesses, and other organizations to self-publish a wide range of electronic and printed matter.

Desktop publishing software is typically installed locally on a user's personal computer. Upgrades to the desktop publishing software may be expensive. Additionally, upgrades have to be installed locally on the machine. Users that install the software on multiple machines typically have to install upgrades separately for each machine.

The subject matter claimed herein is not limited to embodiments that solve any disadvantages or that operate only in environments such as those described above. Rather, this background is only provided to illustrate one exemplary technology area where some embodiments described herein may be practiced.

BRIEF SUMMARY OF SOME EXAMPLE EMBODIMENTS

This Summary is provided to introduce a selection of concepts in a simplified form that are further described below in the Detailed Description. This Summary is not intended to identify key features or essential characteristics of the claimed subject matter, nor is it intended to be used as an aid in determining the scope of the claimed subject matter.

Some example embodiments described herein generally relate to techniques for web-based publishing, including without limitation desktop publishing and publishing content to mobile devices.

In an example embodiment, a method of processing text at a client device in a web-based publishing solution is described. The method includes storing text for a document in a storage format. The method also includes generating a render format from the storage format. The method also includes generating metrics describing the render format. The method also includes rendering the document including the text to a display based at least on the generated metrics.

In another example embodiment, a method of providing on-demand loading of font files that collectively describe a font is described. The method includes determining whether a character to be rendered is included in a first range of characters included in a first one of the font files. The method also includes, if the character is included in the first range of characters, rendering the character according to the first one of the font files. The method also includes, if the character is absent from the first range of characters, requesting a font file that includes a different range of characters including the character; receiving the font file that includes the different range of characters; and rendering the character according to the font file that includes the different range of characters.

Additional features and advantages of the invention will be set forth in the description which follows, and in part will be obvious from the description, or may be learned by the practice of the invention. The features and advantages of the invention may be realized and obtained by means of the instruments and combinations particularly pointed out in the appended claims. These and other features of the present invention will become more fully apparent from the following description and appended claims, or may be learned by the practice of the invention as set forth hereinafter.

BRIEF DESCRIPTION OF THE DRAWINGS

To further clarify the above and other advantages and features of the present invention, a more particular description of the invention will be rendered by reference to specific embodiments thereof which are illustrated in the appended drawings. It is appreciated that these drawings depict only typical embodiments of the invention and are therefore not to be considered limiting of its scope. The invention will be described and explained with additional specificity and detail through the use of the accompanying drawings in which.

DETAILED DESCRIPTION OF SOME EXAMPLE EMBODIMENTS

Reference will now be made to the drawings to describe various aspects of some example embodiments of the invention. The drawings are diagrammatic and schematic representations of such example embodiments, and are not limiting of the present invention, nor are they necessarily drawn to scale.

Figure 1:
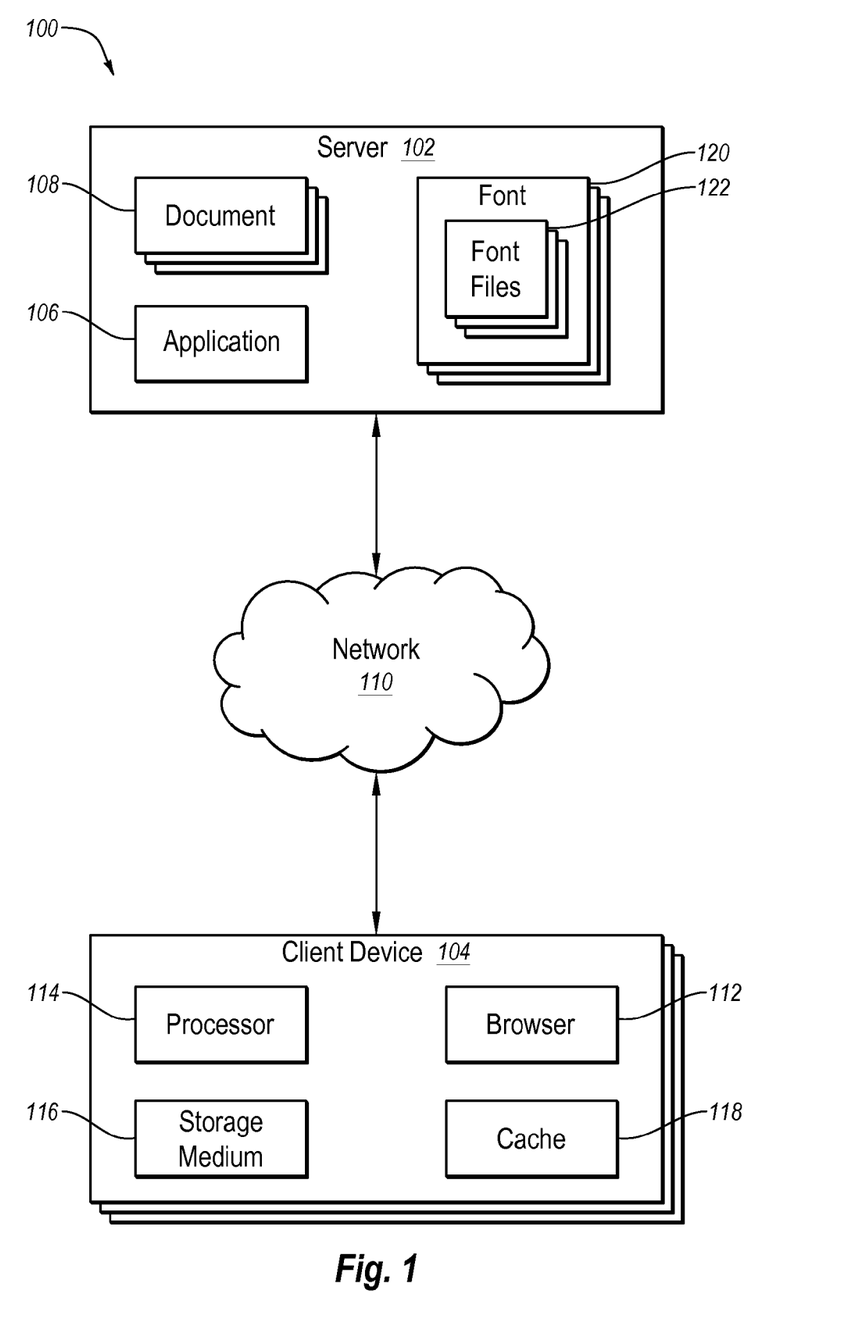
FIG. 1 is a block diagram of an example operating environment in which web-based publishing may be implemented.

FIG. 1 is a block diagram of an example operating environment 100 in which web-based publishing may be implemented, arranged in accordance with at least some embodiments described herein. The operating environment 100 includes a server 102 and one or more client devices 104. In general, the server 102 hosts a web-based publishing application ("application 106") that allows client devices 104 to create and edit documents 108 as described herein. Alternately or additionally, the server 102 facilitates collaboration between multiple client devices 104 by cooperating with the client devices 104 to implement version control and synchronization, some aspects of which are generally described in U.S. patent application Ser. No. 13/361,516, filed Jan. 30, 2012 and entitled AUTOMATIC OFFLINE SYNCHRONIZATION OF BROWSER DOCUMENTS, which application is herein incorporated by reference in its entirety.

The operating environment 100 may additionally include a network 110. In general, the network 110 may include one or more wide area networks (WANs) and/or local area networks (LANs) that enable the server 102 and the client devices 104 to communicate with each other. In some embodiments, the network 110 includes the Internet, including a global internetwork formed by logical and physical connections between multiple WANs and/or LANs. Alternately or additionally, the network 110 may include one or more cellular RF networks and/or one or more wired and/or wireless networks such as, but not limited to, 802.xx networks, Bluetooth access points, wireless access points, IP-based networks, or the like. The network 110 may also include servers that enable one type of network to interface with another type of network.

Each of the client devices 104 executes an application, such as a browser 112, configured to communicate through the network 110 with the server 102. The browser 112 may include an Internet browser or other suitable application. The browser 112 is configured to interact with the application 106 to create new documents 108 and to access, display, and/or edit existing documents 108. For example, the application 106 may serve a web page to the browser 112 of the client device 104. The web page may include a runtime script, such as JavaScript. The runtime script may include instructions executable by the client device 104 to create and/or edit documents 108 and/or to perform one or more of the functions as generally described herein. Each of the client devices 104 may include, but is not limited to, a desktop computer, a laptop computer, a tablet computer, a mobile phone, a smartphone, a personal digital assistant (PDA), or other suitable client device.

Embodiments described herein are not limited to using a browser to create and edit documents 108. For example, rather than or in addition to a browser, the client device 104 may include a mobile app including a software application designed to run on mobile devices, including smartphones and tablet computers. Accordingly, embodiments described herein generally include creating and editing documents 108 using a browser, a mobile app, or other suitable application.

In the illustrated embodiment, the client device 104 additionally includes a processor 114, a computer storage medium ("storage medium") 116, and a cache 118. The processor 114 may be of any type including, but not limited to, a microprocessor (μP), a microcontroller (μC), a digital signal processor (DSP), or any combination thereof. The processor 114 may be configured to execute computer instructions that, when executed, cause the processor 114, or more generally the client device 104, to perform one or more of the operations described herein with respect to the client device 104 and/or the browser 112.

The storage medium 116 may include volatile memory such as random access memory (RAM), persistent or non-volatile storage including, but not limited to, read only memory (ROM), electrically erasable and programmable ROM (EEPROM), compact disc-ROM (CD-ROM) or other optical disk storage, magnetic disk storage or other magnetic storage device, NAND flash memory or other solid state storage device, or other persistent or non-volatile computer storage medium. The storage medium 116 may store computer instructions that may be executed by the processor 114 to perform one or more of the operations described herein with respect to the client device 104 and/or the browser 112. The storage medium 116 may additionally store, at least temporarily, documents 108, one or more runtime scripts, web pages, or other data from the server 102.

The cache 118 may be implemented in RAM or other storage medium. The cache 118 may include individual or multiple characters, words, paragraphs, or other text that has been rendered in a document 108 by the browser 112. The cache 118 may alternately or additionally include metrics associated with the text. As a document 108 is edited in the browser 112, the browser 112 may use the cache 118 to optimize performance as the document 108 is continuously re-rendered while edits are made.

A size of the cache 118 may vary depending on the amount of text and/or other data included in a document 108 being created or otherwise edited in the browser 112. In some embodiments, the cache 118 has a maximum capacity on the order of tens of megabytes, or less or more than tens of megabytes. Alternately or additionally, when the cache 118 reaches its maximum capacity, text or other data may be deleted from the cache 118 to make room for new text or other data based on time of most recent use or other criteria.

FIG. 1 illustrates that the server 102 may additionally include one or more fonts 120. The fonts 120 generally include data defining how each character of the corresponding font 120 should be rendered. In some embodiments, each font 120 includes on the order of a hundred megabytes of data, or less or more than a hundred megabytes of data. Given the relatively large size of each font 120, downloading an entire font 120 from the server to the client device 104 during a session with the server 102 may impose a significant performance penalty.

Accordingly, in some embodiments, each font 120 may be divided into multiple font files 122 that collectively define how each character of the font 120 should be rendered. Each font file 122 may include a different range of characters of the corresponding font 120 than other font files 122 in the same font 120. As such, in some embodiments, the client device 104 downloads font files 122 corresponding to characters being rendered in a document 108 on-demand if and when needed, rather than downloading the entire font 120. In this manner, the amount of font data downloaded to the client device 104 can be reduced compared to downloading an entire font 120 and/or the downloading of the font data can be spread through time by downloading font files 122 as needed, rather than downloading the entire font 120 at one time. The on-demand loading of font files 122 can be implemented together with or independently from web-based publishing.

Although not illustrated in FIG. 1, the server 102 may further include a processor and a storage medium that are analogous to the processor 114 and the storage medium 116 of the client device 104.

Figure 2:
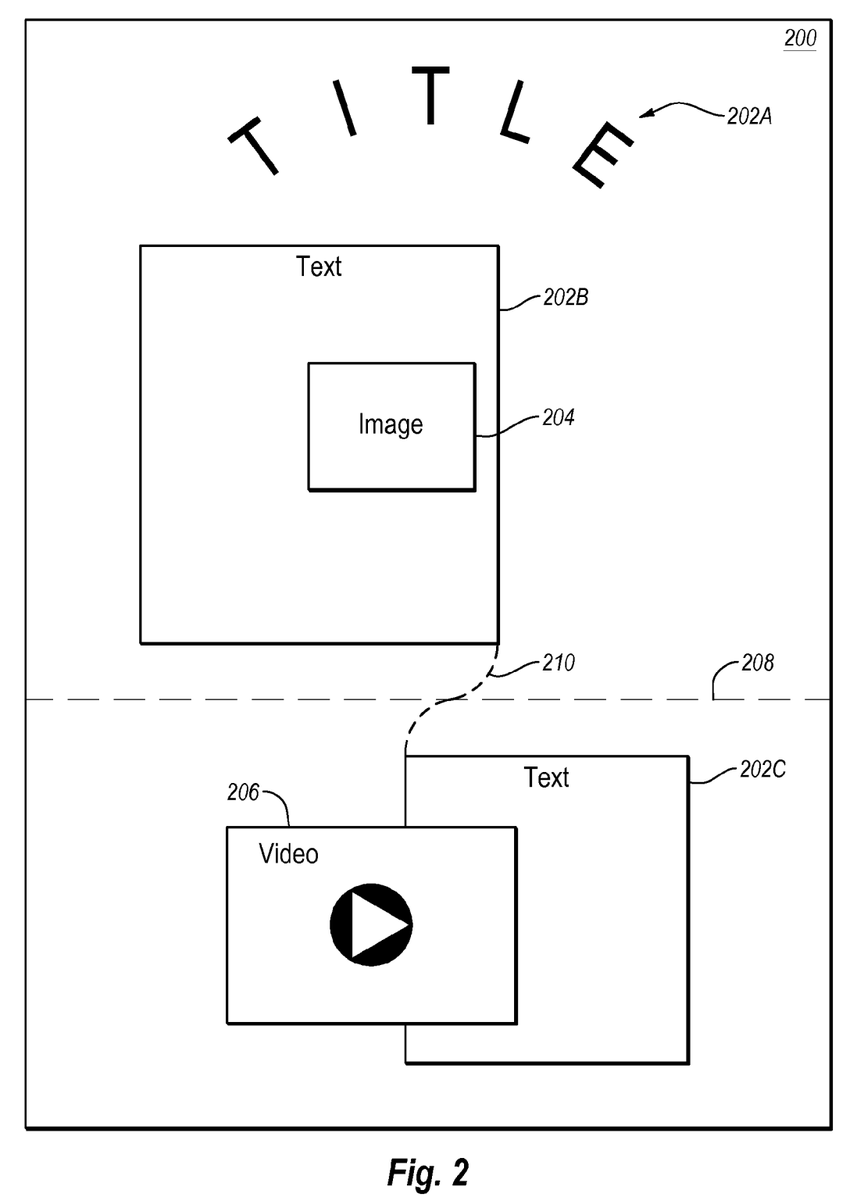
FIG. 2 illustrates an example rendered document.

FIG. 2 illustrates an example rendered document 200, arranged in accordance with at least some embodiments described herein. The rendered document 200 may correspond to one of the documents 108 as rendered by the browser 112 to a display included in or communicatively coupled to the client device 104, for example.

In the illustrated embodiment, the rendered document 200 includes first, second, and third text areas 202A-202C (collectively "text areas 202") as well as an image 204 and a video 206. The text areas 202, image 204, and video 206 are only examples of some elements that may be included in the rendered document 200 and should not be construed to be limiting. Rendered documents may include more or fewer elements than are illustrated in FIG. 2. Alternately or additionally, rendered documents may include any one or more of various types of elements such as, but not limited to, text areas, images, videos, graphics, audio, lines, maps, user comments, web pages or information pulled from the Internet, or the like or any combination thereof.

Some embodiments described herein allow users to transform text in any of a variety of manners. For example, the first text area 202A is illustrated in FIG. 2 as being warped into an arc. More generally, text transformations may include, but are not limited to, rotations, warps, arcs, arches, skews, perspective transformations, or the like or any combination thereof. In some embodiments, a user specifies a text transformation by selecting the text to which a desired transformation will apply and then selecting the desired transformation from a drop-down list or otherwise providing user input effective to specify a transformation thereof.

In some embodiments, the rendered document 200 is divided into multiple pages, as denoted by a first dashed line 208 which abstractly represents a division of the rendered document 200 into multiple pages. The second and third text areas 202B and 202C, as illustrated, are provided on different pages and/or in different locations of the rendered document 200. Moreover, the second and third text areas are linked, as denoted by a second dashed line 210 which abstractly represents a linking of the second and third text areas 202B and 202C. By linking the second and third text areas 202B and 202C together, leftover text (or overflow text) from the second text area 202B may overflow into the third text area 202C when the second text area 202B is full.

Elements such as the image 204 and the video 206 may be dragged and dropped into the rendered document 200 from a source location, such as from the Internet, a folder corresponding to local or network-attached storage of a corresponding client device, or the like or any combination thereof. Alternately or additionally, elements such as the image 204 and the video 206 may be added to the rendered document 200 by navigating one or more menus and/or in other manners.

The text areas 202, image 204, video 206, and/or other elements can generally be placed anywhere in the rendered document 200 and can be moved around by a user, as desired, by clicking and dragging the corresponding element or otherwise providing user input effective to move the corresponding element. In some embodiments, certain elements such as the image 204 and the video 206 are obstacles to text areas 202. In these and other embodiments, when obstacles are located partially or entirely within a corresponding text area, the text within the text area may be automatically relocated so none of it is obscured by the obstacle.

For example, suppose the image 204 is moved from a location outside of the second text area 202B to the illustrated location within the second text area 202B. As the image 204 is being moved into the second text area 202B, some embodiments described herein continuously reflow the text within the second text area 202B around the image 204 substantially in real time so that none of it is obscured by the image 204. Moreover, assuming the second text area 202B is full or nearly full of text before the image 204 is moved within the second text area 202B, leftover text resulting from the increasingly reduced text capacity of the second text area 202B as the image 204 is moved into the second text area 202B can overflow into the third text area 202C since the second and third text areas 202B and 202C are linked in the illustrated embodiment.

Some desktop publishing applications for creating and editing documents, such as the rendered document 200, are locally installed on a computing device, such as a desktop or laptop computer, with all of the functionality being provided locally on the computing device. Some example embodiments described herein, however, provide a web-based publishing solution in which the functionality is provided by a remote server, such as the server 102 of FIG. 1, in cooperation with a thin client, such as the browser 112 and/or a mobile app. The benefits of web-based solutions in general are numerous and include cross-platform compatibility, ease of software updates, and reduced costs, to name a few. Thus, as used herein, the description of a solution or application as being "web-based" indicates that the functionality of the solution or application is generally provided by a remote server in cooperation with a thin client.

Some embodiments described herein include methods of processing text in a web-based publishing solution. The methods described herein may enable some or all of the features described with respect to FIG. 2 and/or other features not explicitly mentioned herein. In general, the methods of processing text may include storing text for a document in a storage format, generating a render format from the storage format, generating metrics describing the render format, and rendering the document based at least on the generated metrics. Additional details regarding the storage format, render format, metrics, and rendering will now be described with respect to FIGS. 3A-3D.

Figures 3A, 3B:
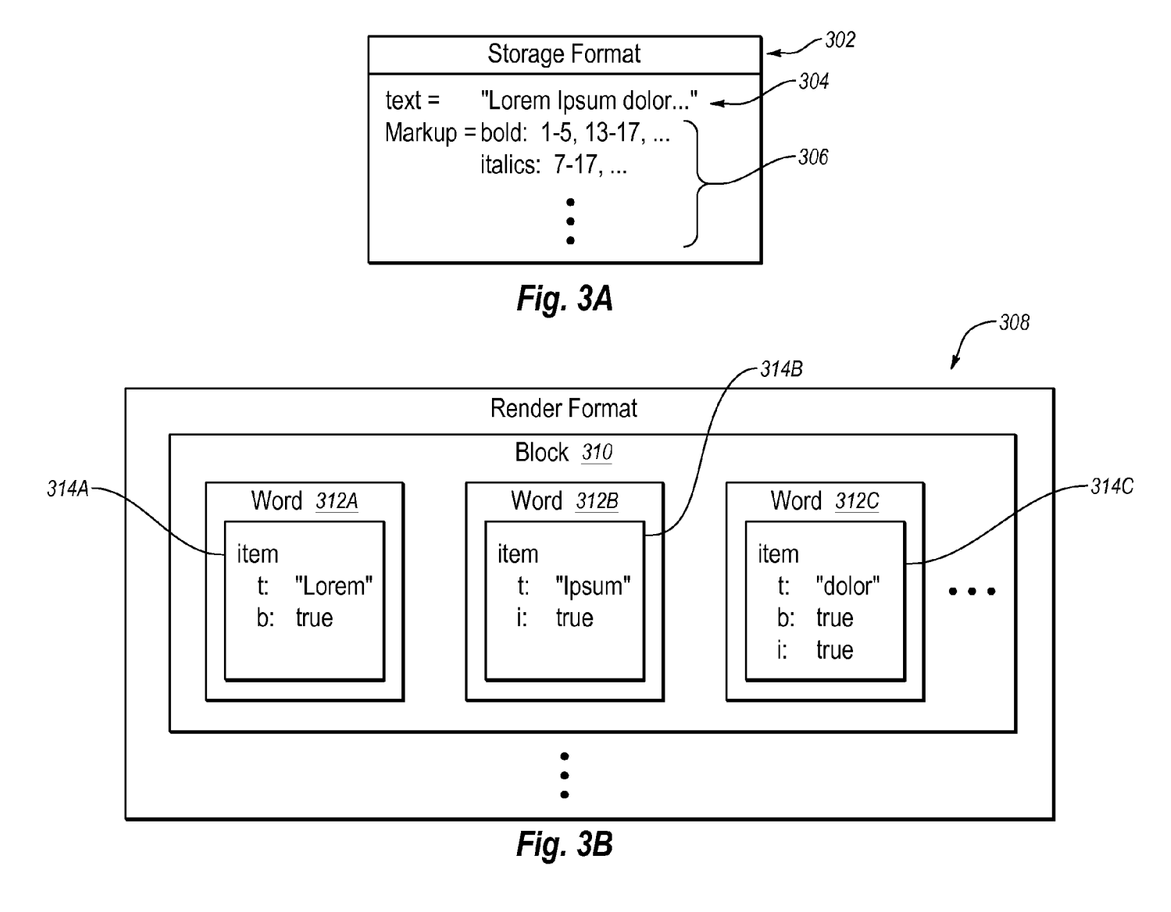
FIG. 3A illustrates an example storage format for text included in a document created according to some embodiments.
FIG. 3B illustrates an example render format for the text of FIG. 3A.

FIG. 3A illustrates an example storage format 302 for text included in a document created according to some embodiments described herein. In the illustrated embodiment, the storage format 302 includes plain text 304 of the entire content of text in the document. The ellipses in the plain text 304 and elsewhere indicate that more can be included than what is explicitly illustrated.

The storage format 302 additionally includes markup 306 that is indexed into the plain text 304, the markup including one or more styles to apply to one or more characters of the plain text 304. The indexing identifies specific characters or ranges of characters to which the styles in the markup 306 are applied. The styles of the markup 306 include bold indexed to characters 1-5 (e.g., "Lorem") and 13-17 (e.g., "dolor") of the plain text 304, as well as italics indexed to characters 7-17 (e.g., "Ipsum dolor") of the plain text 304. More generally, the styles included in the markup 306 may include, but are not limited to, bold, italics, font size, underline, font color, font family, stroking, highlighting, tracking, stretching, line spacing, paragraph margins and borders, indentation levels, bullet styles, column and page breaks, small caps, all caps, drop caps, and the like. Alternately or additionally, the markup 306 may include one or more transformations indexed into the plain text 304. As illustrated in FIG. 3A, in certain embodiments the markup 306 is stored separately from the plain text 304, rather than being intermixed with the plain text 304 as is often the case with HyperText Markup Language (HTML), for instance. In certain embodiments some styles that apply to entire paragraphs, such as line spacing, may be indexed only to the beginning of the paragraph they affect and may be implied to end at the end of that paragraph.

The storage format 302 may be the format in which text for a document is stored on a server, such as text for the documents 108 on the server 102, e.g., when the document is not being rendered. The storage format 302 may also be provided on a client device that is creating and/or editing the document. When the text is edited, the plain text 304 and/or the markup 306 of the storage format 302 may be updated accordingly, leading to corresponding changes in the render format, metrics, and rendering of the document as described below.

In some embodiments, the storage format 302 is a compact format that is convenient for storage when a document is not being edited. Alternately or additionally, the storage format 302 facilitates version control and synchronization algorithms because of its logical simplicity, which algorithms may enable, e.g., collaboration between multiple users.

FIG. 3B illustrates an example render format 308 for the text of FIG. 3A, arranged in accordance with at least some embodiments described herein. To generate the render format 308 from the storage format 302, the plain text 304 is broken into blocks 310 based on logical separation points in the plain text. Examples of logical separation points may include hard returns. Thus, each of the blocks 310 may correspond to a different paragraph of the plain text 304. Alternately or additionally, one or more transformations applicable to the corresponding text may be stored in the block 310.

Within each block 310, the plain text 304 is broken into individual words 312, including words 312A, 312B, and 312C. In general, for each word 312, the style or styles applied to the word is or are identified based on the markup 306. The plain text 304 of each word 312 as well as the corresponding style(s) identified based on the markup 306 may be included in a corresponding item 314, including items 314A, 314B, and 314C. For instance, the word 312A includes the item 314A with the corresponding plain text, e.g., "Lorem" in this example, and the corresponding style(s), e.g., bold (e.g., "b: true") in this example.

In some embodiments, each word 312 includes a single item 314 unless the word 312 has different styles applied to different portions of the word 312. In these and other embodiments, each word 312 may include multiple items 314, each corresponding to one of the different portions of the word 312.

Figure 3C:
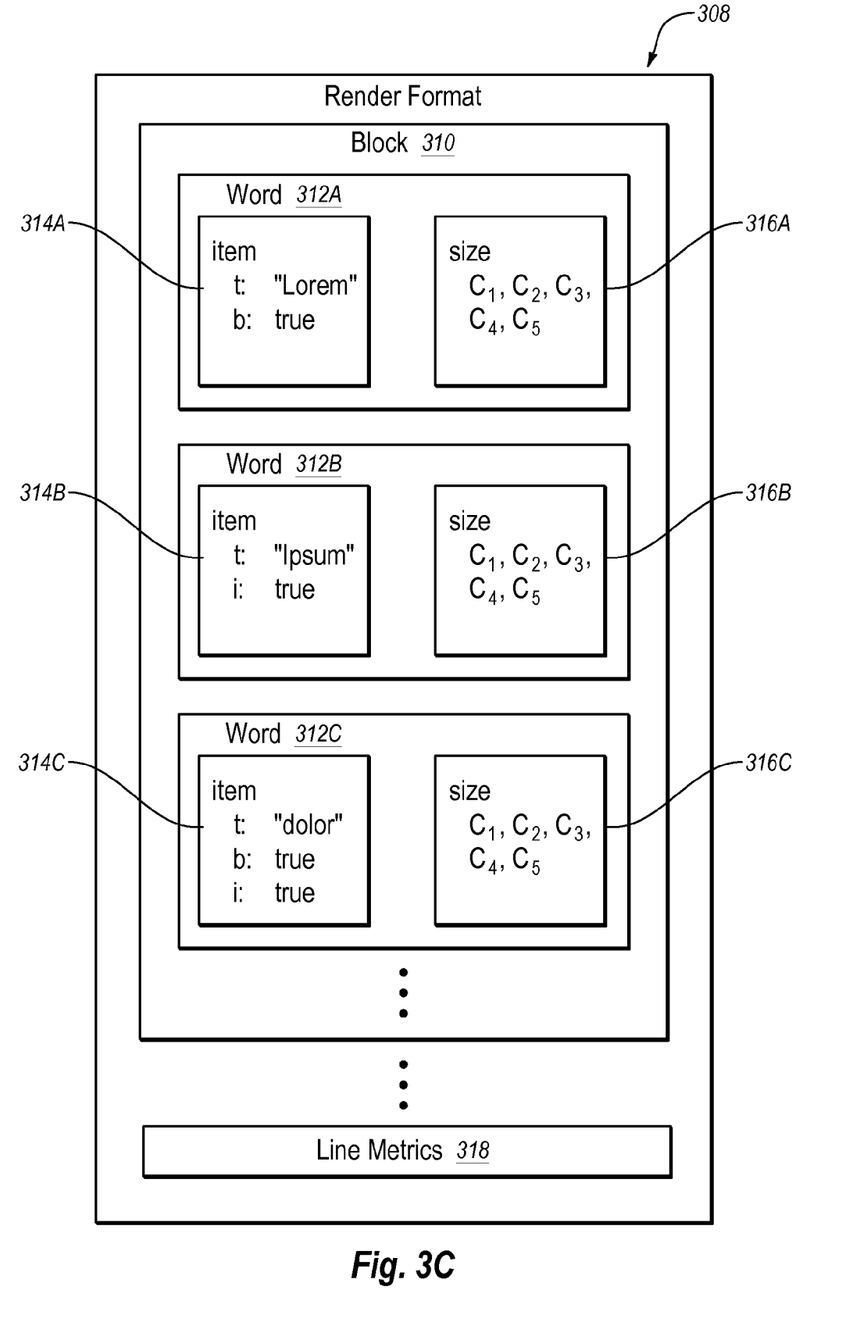
FIG. 3C illustrates the render format of FIG. 3B with added metrics.

After generating the render format 308, metrics describing the render format are generated. In some embodiments, the metrics are added to the render format 308. For example, FIG. 3C illustrates the render format 308 of FIG. 3B with added metrics 316A-316C (hereinafter "316") and 318, arranged in accordance with at least some embodiments described herein.

The added metrics 316, 318 include size objects 316 and line metrics 318. Calculating each size object 316 may be a relatively time- and/or processor-intensive operation. The size objects 316 include separate size objects 316A, 316B, 316B added to each word 312A, 312B, 312C, respectively. For example, FIG. 3C illustrates the size object 316A, 316B, 316C respectively added to the word 312A, 312B, 312C. Each size object 316 includes a size C of each character in each word 312 and relative to the word 312 itself. The subscript of each character size C in the size objects 316 of FIG. 3C refers to the relative position of the corresponding character in the word 312. For example, $C_1$ is the size of the first character in the corresponding word 312, $C_2$ is the size of the second character in the corresponding word 312, and so on. Moreover, because each of the words 312A, 312B, 312C illustrated in FIG. 3C has five characters, each of the size objects 316A, 316B, 316C, respectively, includes five character sizes $C_1$ to $C_5$.

Additionally, although the same symbol $C_1$ to $C_5$ is used to represent the character size of the first to fifth character in each of the size objects 316A-316C, a value of each symbol $C_1$ to $C_5$ is not necessarily the same across the size objects 316A-316C. For example, the character size $C_2$ in the size object 316A may have a value of 4, while the character size $C_2$ in the size object 316B may have a value of 5 and the character size $C_2$ in the size object 316C may have a value of 2. Alternately, some or all of the same character sizes (e.g., $C_2$) across size objects 316A-316C may have the same values.

In some embodiments, the size C of each character in a word 312 includes a relative pixel location where the character begins relative to the word 312. By way of example, character sizes $C_1$, $C_2$, $C_3$, $C_4$, and $C_5$ having respective values of 0, 4, 8, 9, and 14 in a size object 316 may indicate that the first character begins at the zeroth pixel of the word 312, the second character begins at the fourth pixel of the word 312, the third character begins at the eighth pixel of the word 312, the fourth character begins at the ninth pixel of the word 312, and the fifth character begins at the fourteenth pixel of the word 312.

The line metrics 318 include a size of each of the words 312 (hereinafter "word size") in each of the blocks 310. For each word 312, the line metrics 318 point to a location in the document where the word 312 will be rendered based on its word size, available space in the document for text, and any obstacles in the document. For example, using the word sizes, it may be relatively straightforward to determine which words 312 can fit on each line of a text area defining a line length where one or more of the lines may have a relatively shorter line length due to the presence of an obstacle at least partially within the text area.

The line metrics 318 may additionally identify one or more leftover words from a corresponding text area that no longer fit in the text area. The leftover words may be moved into another text area linked thereto during rendering.

Figure 3D:
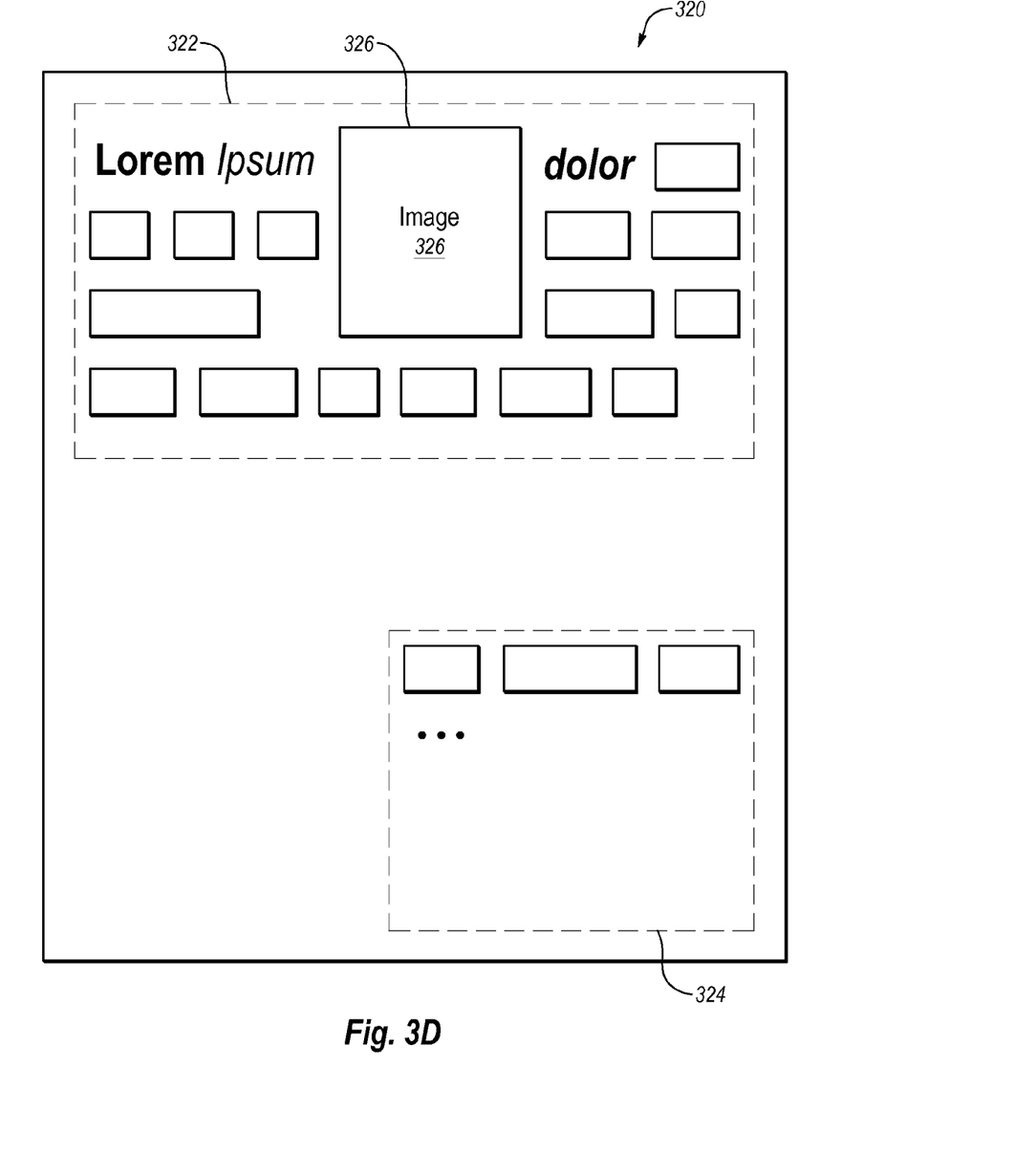
FIG. 3D illustrates an example rendered document including the text of FIG. 3A.

FIG. 3D illustrates an example rendered document 320 including the text of FIG. 3A, arranged in accordance with at least some embodiments described herein. The rendered document 320 may be generated by feeding the render format 308 with the added metrics 316, 318 of FIG. 3C into a rendering engine. The rendering engine may be instantiated in a browser or mobile app on a client device by, e.g., executing a runtime script downloaded from a server. The rendering engine loops through the information in the render format 308 of FIG. 3C, including the added metrics 316, 318, to render the text along with any other elements in the same document to a display as the rendered document 320.

As illustrated in FIG. 3D, the rendered document 320 includes two linked text areas 322, 324 and an image 326 or other obstacle. Other than the first three words "Lorem Ipsum dolor," other individual words in the rendered document 320 are each represented by a corresponding one of the rectangular blocks and/or by ellipses in the text areas 322, 324 of FIG. 3D.

Each word may be rendered on an individual layer. Aspects of rendering graphical objects on individual layers, which may be analogously applied to rendering words on individual layers, are described in U.S. patent application Ser. No. 12/896,664, filed Oct. 1, 2010 and entitled MANIPULATING GRAPHICAL OBJECTS, which application is herein incorporated by reference in its entirety. Alternately, all of the words may be rendered on the same layer, or different groups of words may each be rendered on different layers.

Each time a rendered document is edited, the steps of generating a second render format, generating metrics, and rendering the document may be performed substantially in real time as the edits occur. To optimize system performance, various layers of caching may be used. For example, and with combined reference to FIGS. 3B-3C, individual words 312, size objects 316, and/or blocks 310 may be cached in a cache, such as the cache 118 of FIG. 1, and may be re-used when unaltered by the edit to avoid recalculating the corresponding size objects 316. Alternately or additionally, when a paragraph or word added by the edit is identical to one of the blocks 310 or words 312 already in the cache, the cached block 310 or word 312 with the corresponding size object(s) 316 may be copied from the cache to avoid recalculating the corresponding size object(s) 316. Additional aspects of caching and the use thereof are provided below in the discussion of FIG. 5A.

Other optimizations to reduce or minimize latency may include using JavaScript functions to render characters of a word when the word is not in the cache. In these and other embodiments, the first time a character is rendered, a JavaScript function for rendering the character may be generated from a corresponding font file and the JavaScript function may be executed to render the character. The JavaScript function may be saved. The JavaScript function may be executed as needed thereafter to render the same character without re-generating the JavaScript function.

Figure 4A:
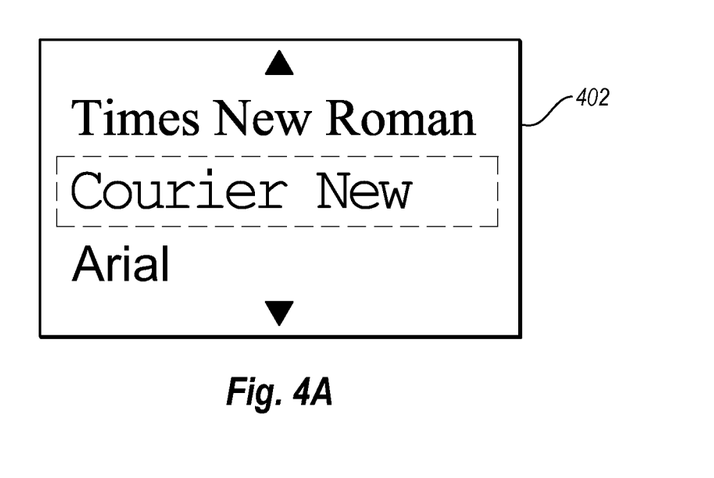
FIGS. 4A-4C illustrate aspects of a method of providing on-demand loading of font files.
Figure 4B:
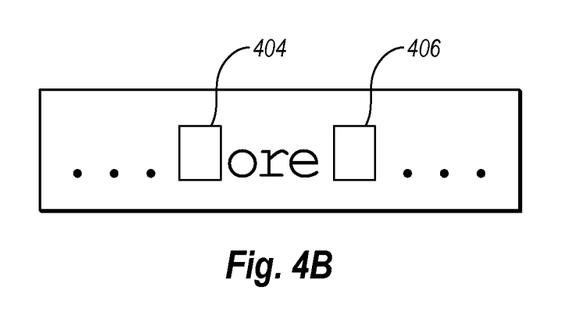
Figure 4C:
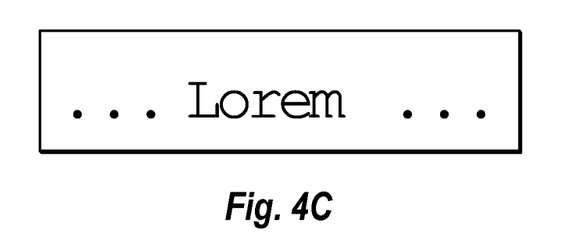

Alternately or additionally, on-demand loading of font files may be provided as mentioned previously. FIGS. 4A-4C illustrate aspects of a method of providing on-demand loading of font files, arranged in accordance with at least some embodiments described herein.

In general, and with combined reference to FIGS. 1 and 4A-4C, when the client device 104 initiates a session with the server 102, the client device 104 may download at least one font file 122 for at least one font 120. The downloaded font file 122 may include a range of characters that covers at least the characters in the name of font 120 such that at least the name of the font 120 can be rendered according to the font 120 to provide a sample of what the font 120 looks like to users. Optionally, a first font file 122 for each of multiple fonts 120 may be initially downloaded, where the first font file 122 includes a range of characters that covers at least the characters in the name of the corresponding font 120. The range of characters in the first font file 122 may be limited, in some embodiments, to the characters in the name of the corresponding font 120 to provide samples of what each of the fonts 120 looks like to users while downloading only a relatively small amount of data.

For example, FIG. 4A illustrates a menu 402 that may be rendered by the browser 112 on the client device 104 in which names of various fonts 120 are rendered according to the corresponding one of the various fonts 120 so that a user has a sample of what each of the various fonts 120 look like. In the example of FIG. 4A, the various fonts 120 include Times New Roman, Courier New, and Arial, the names of the various fonts 120 each being rendered in FIG. 4A according to the corresponding one of the various fonts 120.

FIG. 4A further illustrates selection of the Courier New font 120 as denoted by the dashed line surrounding the name "Courier New." With continued reference to FIGS. 1 and 4A-4C, suppose out of all of the font files 122 of the Courier New font 120, the client device 104 has only received the first font file 122 of the Courier New font 120 and the first font file 122 of the Courier New font 120 includes a range of characters covering only the characters in the name "Courier New." Further suppose that a user has entered the word "Lorem" for rendering by the client device 104. Since the characters "L" and "m" of the word "Lorem" are absent from the range of characters included in the first font file 122 for the Courier New Font 120, the client device 104 lacks enough font information to render the complete word "Lorem."

Accordingly, the client device 104 may request from the server 102 one or more additional font files 122 of the Courier New font 120 including a range of characters that includes the characters "L" and "m" that are absent from any font files 122 of the Courier New font 120 that are already at the client device 104. The request may be made, in some embodiments, by identifying to the server 102 the particular characters "L" and "m" that are absent from any font files 122 of the Courier New font 120 that are already at the client device 104. In response to receiving the request, the server 102 may identify a particular font file(s) 122 that includes a range of characters including the identified characters and may send the particular font file(s) 122 back to the client device 104 to be downloaded by the client device 104. The client device 104 may then render the characters "L" and "m" that were absent from the first font file 122 of the Courier New font 120 according to the particular font file(s) 122 downloaded from the server 102.

In some embodiments, the client device 104 initially renders a placeholder for each character that is absent from any of the font files 122 of the font 120 that are already at the client device 104. For example, continuing with the preceding example, FIG. 4B illustrates the word "Lorem" being initially rendered with placeholders 404, 406 for the characters "L" and "m" until the particular font file(s) 122 for the characters "L" and "m" is downloaded by the client device 104 from the server 102. After downloading the particular font file(s) 122, and as illustrated in FIG. 4C, the characters "L" and "m" may be rendered according to the particular font file(s) 122 and the placeholders 404, 406 may be removed.

In other embodiments, the client device 104 waits to render each word until any additional font files 122, if needed, are downloaded from the server 102.

Figure 5A:
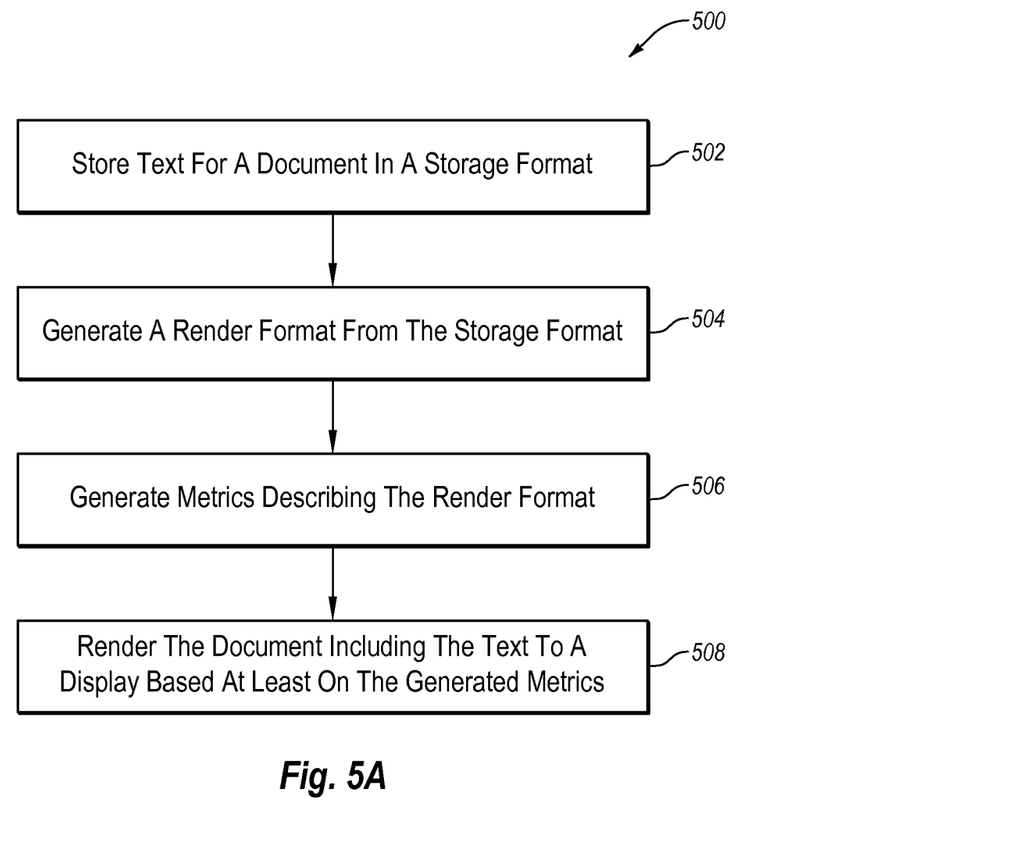
FIG. 5A shows an example flow diagram of a method of processing text at a client device in a web-based publishing solution.

FIG. 5A shows an example flow diagram of a method 500 of processing text at a client device in a web-based publishing solution, arranged in accordance with at least some embodiments described herein. The method 500 may be performed in whole or in part by, e.g., the client device 104 of FIG. 1. In some embodiments, for example, the method 500 is executed by the client device 104 in response to the client device 104 executing a runtime script including instructions for performing the method 500, the runtime script being provided to the client device 104 in a web page loaded by the browser 112 from the server 102. Although illustrated as discrete blocks, various blocks may be divided into additional blocks, combined into fewer blocks, or eliminated, depending on the desired implementation.

The method 500 may begin at block 502 in which text for a document is stored in a storage format. The storage format may correspond to the storage format 302 of FIG. 3A, for instance. Accordingly, storing text in a storage format may include storing text as plain text in the storage format and storing markup of the plain text in the storage format separate from the plain text. The markup may be indexed into the plain text.

In block 504, a render format is generated from the storage format. The render format is different than the storage format. For example, the render format may correspond to the render format 308 of FIG. 3B. Accordingly, generating a render format from the storage format may include breaking the plain text into blocks based on logical separation points in the plain text; breaking the plain text within each block into separate words, and identifying a style applied to each word based on the markup. Each of the blocks may correspond to a different paragraph of the plain text.

In block 506, metrics describing the render format are generated. The metrics describing the render format may include the metrics 316, 318 of FIG. 3C, for example. Generating metrics describing the render format may include determining a size of each character in each word; adding a size object to each word in the render format, the size object including the determined size of each character in the word; determining a size of each word; and adding line metrics to the render format. The line metrics may include the size of each word. For each word, the line metrics may point to a location in the document where the word will be rendered based on the size of the word, available space in the document for text, and any obstacles in the document.

In block 508, the document including the text is rendered to a display based at least on the generated metrics. The document as rendered may correspond to the rendered document 320 of FIG. 3D, for example. In some embodiments, the rendering is additionally based on a cache of rendered words, such as the cache 118 of FIG. 1. In these and other embodiments, rendering the document including the text to the display may include, if a word being rendered at a location in the document matches a rendered word in the cache, moving the rendered word to the location if the rendered word has not already been used, or copying the rendered word to the location if the rendered word has already been used. Alternately or additionally, a layer with the word already drawn on it may be moved or copied to the location.

On the other hand, if the word being rendered at the location in the document does not match any rendered words in the cache, each character of the word may be rendered according to a corresponding font file. In these and other embodiments, rendering each character of the word according to a corresponding font file may include, if the character has not been rendered before, generating from the font file a JavaScript function for rendering the character and executing the JavaScript function, or if the character has been rendered before, executing the JavaScript function for rendering the character.

In some embodiments, such as in a mobile app on a mobile device, select words in the cache may be copied out of the cache directly onto a layer which may be referred to as a flattened display canvas. In comparison, in some other embodiments described herein, words copied from the cache may be copied onto single-word canvases (or layers) that are then layered to give the effect of laying out the text of the document. The modified approach of copying select words out of the cache onto a flattened display canvas may improve memory consumption and processing speed in embodiments where high-speed text editing is less important than the benefits of a simplified document object model (DOM).

The method 500 may be performed by a browser on a client device. Alternately or additionally, the method 500 may be performed by a mobile app on a mobile device.

One skilled in the art will appreciate that, for this and other processes and methods disclosed herein, the functions performed in the processes and methods may be implemented in differing order. Furthermore, the outlined steps and operations are only provided as examples, and some of the steps and operations may be optional, combined into fewer steps and operations, or expanded into additional steps and operations without detracting from the essence of the disclosed embodiments.

For example, in some embodiments, the document includes an obstacle. In these and other embodiments, the method 500 may further include, after rendering the document, receiving input effective to move the obstacle from a first location to a second location. The method 500 may further include reflowing the text around the obstacle substantially in real time as the obstacle is moved from the first location to the second location.

Optionally, prior to receiving the input effective to move the obstacle, the method 500 may further include caching the blocks, words, and added size objects of the render format in a cache. In these and other embodiments, the text reflows around the obstacle substantially in real time as the obstacle is moved from the first location to the second location by substantially continuously performing the following while the object is being moved from the first location to the second location: determining that the storage format from which the render format is generated is unchanged; generating a new render format from the cache without breaking the plain text from the storage format into blocks and words a second time; generating second metrics describing the new render format without determining a size of each character in each word a second time and without adding a size object to each word a second time, including adding line metrics pointing to locations in the document where words will be rendered based on a size of each of the words, available space in the document, and a current location of the obstacle; and rendering the document including the text and the obstacle to the display based at least on the generated second metrics.

Alternately or additionally, the method 500 may further include receiving input effective to specify a transformation of a portion of the text. Each character of text may be specified by a font file. In these and other embodiments, rendering the document including the text to the display may include applying the transformation to each of multiple points of each character of the portion of the text. The points of each character may be specified by the font file.

Alternately or additionally, the document may include multiple text areas, including a first text area linked to a second text area. The line metrics may further include one or more leftover words that were in the first text area prior to a change in the first text area that results in the leftover words no longer fitting in the first text area. In these and other embodiments, as the document is rendered, the leftover words may be moved to the second text area.

Alternately or additionally, the method 500 may further include downloading from a server a first of multiple font files that collectively define how each character of a font should be rendered. Each of the font files may include a different range of characters of the font. In these and other embodiments, rendering the document including the text to the display may include, if a character being rendered is included in a first range of characters included in the first font file, rendering the character according to the first font file. Or if the character being rendered is absent from the first range of characters, rendering the document including the text to the display may include: requesting from the server a second font file including a second range of characters that includes the character being rendered; receiving the second font file; and rendering the character according to the second font file.

Some embodiments described herein include an article of manufacture such as a computer storage medium having instructions stored thereon that are executable by a computing device to perform operations included in the method 500 of FIG. 5A, such as the operations illustrated by blocks 502, 504, 506, and/or 508 in FIG. 5A, and/or variations thereof. The computer storage medium may include the storage medium 116 of FIG. 1, for example. The computing device may include the client device 104, and/or the processor 114 of FIG. 1, for example.

Figure 5B:
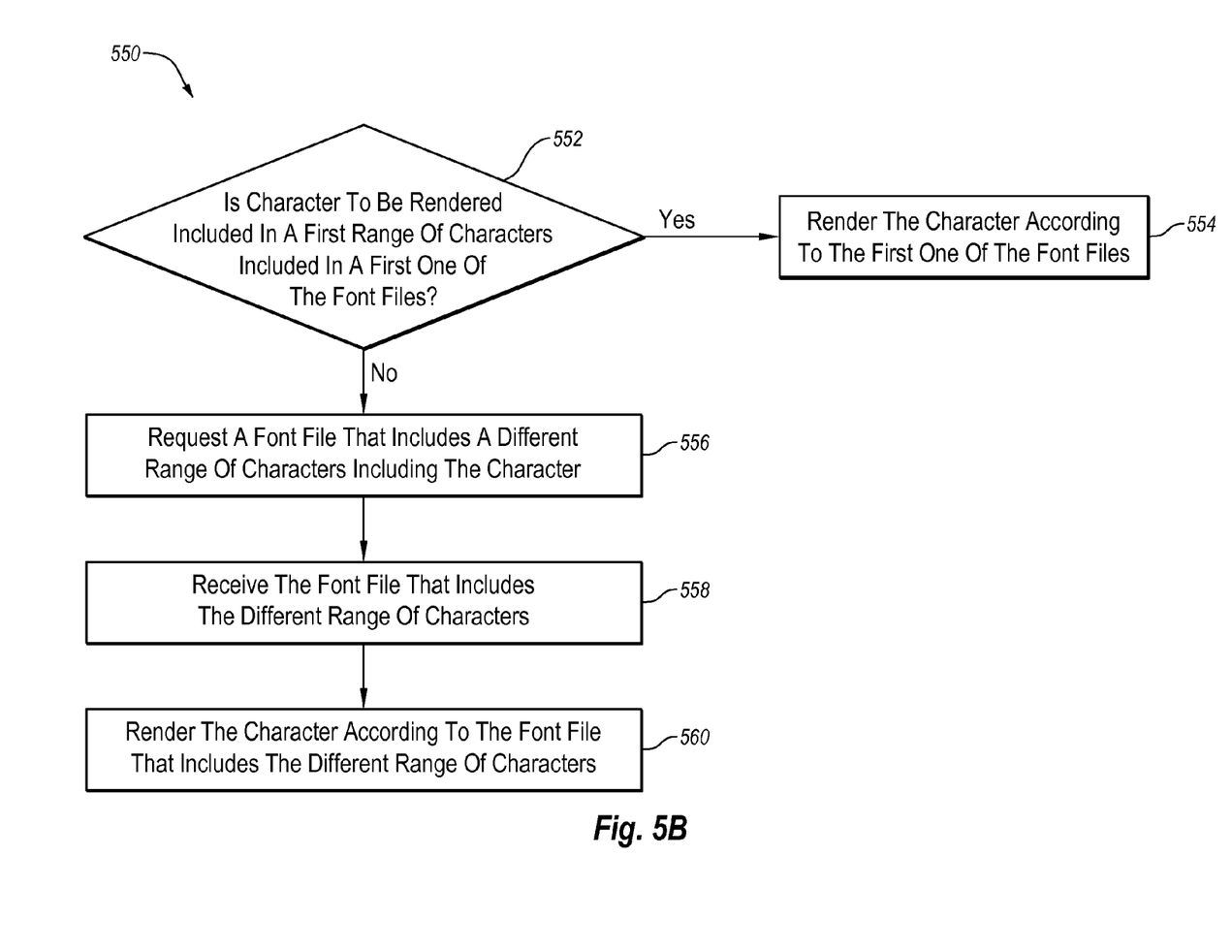
FIG. 5B shows an example flow diagram of a method of providing on-demand loading of font files that collectively define how each character of a font should be rendered.

FIG. 5B shows an example flow diagram of a method 550 of providing on-demand loading of font files that collectively define how each character of a font should be rendered, arranged in accordance with at least some embodiments described herein. The method 550 may be performed in whole or in part by, e.g., the client device 104 of FIG. 1. In some embodiments, for example, the method 550 is executed by the client device 104 in response to the client device 104 executing a runtime script including instructions for performing the method 550, the runtime script being provided to the client device 104 in a web page loaded by the browser 112 from the server 102. Although illustrated as discrete blocks, various blocks may be divided into additional blocks, combined into fewer blocks, or eliminated, depending on the desired implementation.

The method may begin at block 552 in which it is determined whether a character to be rendered is included in a first range of characters included in a first one of the font files.

If it is determined that the character is included in the first range of characters ("Yes" at block 552), the method 550 proceeds to block 554. In block 554, the character is rendered according to the first one of the font files.

If it is determined that the character is absent from the first range of characters ("No" at block 552), the method 550 proceeds to block 556. In block 556, a font file is requested that includes a different range of characters including the character.

In block 558, the font file that includes the different range of characters is received.

In block 560, the character is rendered according to the font file that includes the different range of characters.

In each of blocks 556 and 560, rendering the character according to the corresponding font file may include: if the character has not been rendered before, generating from the corresponding font file a JavaScript function for rendering the character and executing the JavaScript function; or if the character has been rendered before, executing the JavaScript function for rendering the character.

Although not illustrated in FIG. 5B, the method 550 may additionally include, if the character is absent from the first range of characters, rendering a placeholder for the character until after the font file that includes the different range of characters is received and the character is rendered according to the font file that includes the different range of characters.

Alternately or additionally, the method 550 further includes executing the method by a browser on a client device or by a mobile app on a mobile device.

Some embodiments described herein include an article of manufacture such as a computer storage medium having instructions stored thereon that are executable by a computing device to perform operations included in the method 550 of FIG. 5B, such as the operations illustrated by blocks 552, 554, 556, 558, and/or 560 in FIG. 5B, and/or variations thereof. The computer storage medium may include the storage medium 116 of FIG. 1, for example. The computing device may include the client device 104, and/or the processor 114 of FIG. 1, for example.

Figure 6:
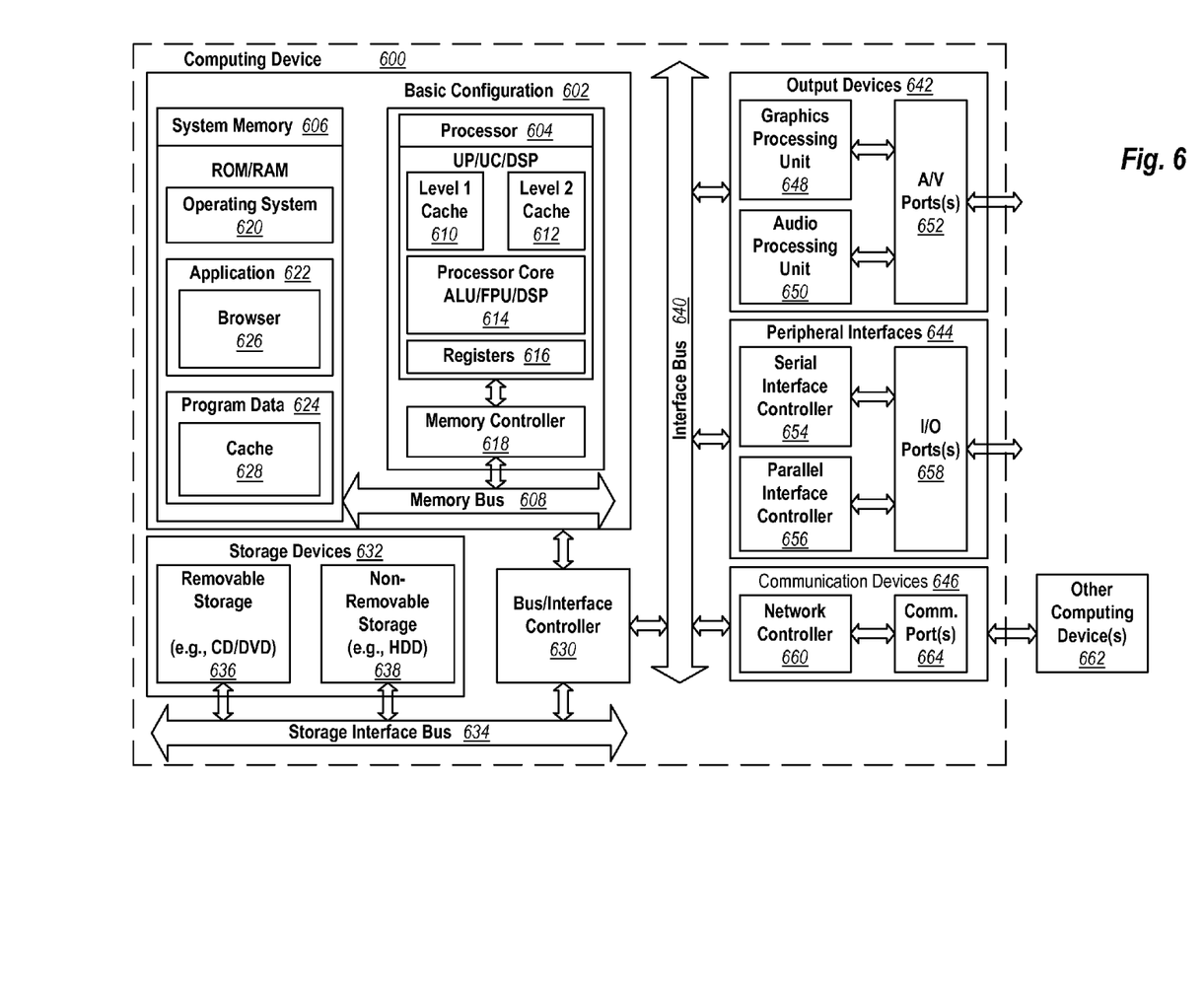
FIG. 6 is a block diagram illustrating an example computing device that is arranged for web-based publishing.

FIG. 6 is a block diagram illustrating an example computing device that is arranged for web-based publishing, in accordance with at least some embodiments described herein. The computing device 600 may be included in or correspond to the client device 104 of FIG. 1, for example. In a very basic configuration 602, the computing device 600 typically includes one or more processors 604 and a system memory 606. A memory bus 608 may be used for communicating between the processor 604 and the system memory 606.

Depending on the desired configuration, the processor 604 may be of any type including, but not limited to, a µP, a µC, a DSP, or any combination thereof. The processor 604 may include one more levels of caching, such as a level one cache 610 and a level two cache 612, a processor core 614, and registers 616. An example processor core 614 may include an arithmetic logic unit (ALU), a floating point unit (FPU), a digital signal processing core (DSP Core), or any combination thereof. An example memory controller 618 may also be used with the processor 604, or in some implementations the memory controller 618 may be an internal part of the processor 604.

Depending on the desired configuration, the system memory 606 may be of any type including, but not limited to, volatile memory (such as RAM), non-volatile memory (such as ROM, flash memory, etc.), or any combination thereof. The system memory 606 may include an OS 620, one or more applications 622, and program data 624. The application 622 may include a browser 626, an app, an application server, or other application that is arranged to perform one or more of the functions as described herein, including those described with respect to the methods 500 and/or 550 of FIGS. 5A-5B. The program data 624 may include a cache 628 and/or font files that may be used as described above to optimize system performance when rendering text, for example. In some embodiments, the application 622 may be arranged to operate with the program data 624 on the OS 620 such that implementations of methods of processing text and/or providing on-demand loading of font files such as the methods 500 and 550 of FIGS. 5A-5B may be provided as described herein.

The computing device 600 may have additional features or functionality, and additional interfaces to facilitate communications between the basic configuration 602 and any required devices and interfaces. For example, a bus/interface controller 630 may be used to facilitate communications between the basic configuration 602 and one or more data storage devices 632 via a storage interface bus 634. The data storage devices 632 may be removable storage devices 636, non-removable storage devices 638, or a combination thereof. Examples of removable storage and non-removable storage devices include magnetic disk devices such as flexible disk drives and hard-disk drives (HDD), optical disk drives such as compact disk (CD) drives or digital versatile disk (DVD) drives, solid state drives (SSD), and tape drives to name a few. Example computer storage media may include volatile and nonvolatile, removable and non-removable media implemented in any method or technology for storage of information, such as computer-readable instructions, data structures, program modules, or other data.

The system memory 606, removable storage devices 636, and non-removable storage devices 638 are examples of computer storage media. Computer storage media includes, but is not limited to, RAM, ROM, EEPROM, flash memory or other memory technology, CD-ROM, digital versatile disks (DVD) or other optical storage, magnetic cassettes, magnetic tape, magnetic disk storage or other magnetic storage devices, or any other medium which may be used to store the desired information and which may be accessed by the computing device 600. Any such computer storage media may be part of the computing device 600.

The computing device 600 may also include an interface bus 640 for facilitating communication from various interface devices (e.g., output devices 642, peripheral interfaces 644, and communication devices 646) to the basic configuration 602 via the bus/interface controller 630. Example output devices 642 include a graphics processing unit 648 and an audio processing unit 650, which may be configured to communicate to various external devices such as a display or speakers via one or more A/V ports 652. Example peripheral interfaces 644 include a serial interface controller 654 or a parallel interface controller 656, which may be configured to communicate with external devices such as input devices (e.g., keyboard, mouse, pen, voice input device, touch input device, etc.) or other peripheral devices (e.g., printer, scanner, etc.) via one or more I/O ports 658. An example communication device 646 includes a network controller 660, which may be arranged to facilitate communications with one or more other computing devices 662 over a network communication link via one or more communication ports 664.

The network communication link may be one example of a communication media. Communication media may typically be embodied by computer-readable instructions, data structures, program modules, or other data in a modulated data signal, such as a carrier wave or other transport mechanism, and may include any information delivery media. A "modulated data signal" may be a signal that has one or more of its characteristics set or changed in such a manner as to encode information in the signal. By way of example, and not limitation, communication media may include wired media such as a wired network or direct-wired connection, and wireless media such as acoustic, radio frequency (RF), microwave, infrared (IR), and other wireless media. The term computer-readable media as used herein may include both storage media and communication media.

The computing device 600 may be implemented as a portion of a small-form factor portable (or mobile) electronic device such as a cell phone, a personal data assistant (PDA), a personal media player device, a wireless web-watch device, a personal headset device, an application specific device, or a hybrid device that includes any of the above functions. The computing device 600 may also be implemented as a personal computer, including both laptop computer and non-laptop computer configurations.

The present disclosure is not to be limited in terms of the particular embodiments described herein, which are intended as illustrations of various aspects. Many modifications and variations can be made without departing from its spirit and scope, as will be apparent to those skilled in the art. Functionally equivalent methods and apparatuses within the scope of the disclosure, in addition to those enumerated herein, will be apparent to those skilled in the art from the foregoing descriptions. Such modifications and variations are intended to fall within the scope of the appended claims. The present disclosure is to be limited only by the terms of the appended claims, along with the full scope of equivalents to which such claims are entitled. It is to be understood that the present disclosure is not limited to particular methods, reagents, compounds, compositions, or biological systems, which can, of course, vary. It is also to be understood that the terminology used herein is for the purpose of describing particular embodiments only, and is not intended to be limiting.

With respect to the use of substantially any plural and/or singular terms herein, those having skill in the art can translate from the plural to the singular and/or from the singular to the plural as is appropriate to the context and/or application. The various singular/plural permutations may be expressly set forth herein for sake of clarity.

The present invention may be embodied in other specific forms without departing from its spirit or essential characteristics. The described embodiments are to be considered in all respects only as illustrative and not restrictive. The scope of the invention is, therefore, indicated by the appended claims rather than by the foregoing description. All changes which come within the meaning and range of equivalency of the claims are to be embraced within their scope.

What is claimed is:

1. A method of processing text at a client device in a web-based publishing solution, the method comprising:
    storing text for a document in a storage format, wherein storing text in a storage format comprises storing text as plain text in the storage format and storing a markup of the plain text in the storage format separate from the plain text, the markup being indexed into the plain text;
    generating a render format from the storage format, wherein generating a render format from the storage format comprises:
        breaking the plain text into blocks based on logical separation points in the plain text;
        within each block, breaking the plain text into separate words; and
        for each word, identifying a style applied to the word based on the markup;
    generating metrics describing the render format, wherein generating metrics describing the render format comprises:
        determining a size of each character in each word;
        adding a size object to each word in the render format, the size object including the determined size of each character in the word;
        determining a size of each word; and
        adding line metrics to the render format, the line metrics including the size of each word and, for each word, the line metrics pointing to a location in the document where the word will be rendered based on the size of the word, available space in the document for text, and any obstacles in the document; and
    rendering the document including the text to a display based at least on the generated metrics.

2. The method of claim 1, wherein each of the blocks corresponds to a different paragraph of the plain text.

3. The method of claim 1, wherein:
    the document includes multiple text areas including a first text area linked to a second text area;
    the line metrics further include one or more leftover words that were in the first text area prior to a change in the first text area that results in the leftover words no longer fitting in the first text area; and
    as the document is rendered, the leftover words are moved to the second text area.

4. The method of claim 1, wherein the document includes an obstacle, the method further comprising:
    after rendering the document, receiving input effective to move the obstacle from a first location to a second location; and
    reflowing the text around the obstacle substantially in real time as the obstacle is moved from the first location to the second location.

5. The method of claim 4, further comprising, prior to receiving the input effective to move the obstacle from the first location to the second location, caching the blocks, words, and added size objects of the render format in a cache, wherein the text reflows around the obstacle substantially in real time as the obstacle is moved from the first location to the second location by substantially continuously performing the following while the object is being moved from the first location to the second location:
 determining that the storage format from which the render format is generated is unchanged;
 generating a new render format from the cache without breaking the plain text from the storage format into blocks and words a second time;
 generating second metrics describing the new render format without determining a size of each character in each word a second time and without adding a size object to each word a second time, including adding line metrics pointing to locations in the document where words will be rendered based on a size of each of the words, available space in the document, and a current location of the obstacle; and
 rendering the document including the text and the obstacle to the display based at least on the generated second metrics.

6. The method of claim 1, further comprising, receiving input effective to specify a transformation of a portion of the text, wherein each character of text is specified by a font file and rendering the document including the text to the display includes applying the transformation to each of multiple points of each character of the portion of the text, the multiple points of each character being specified by the font file.

7. The method of claim 1, wherein rendering the document based at least on the generated metrics is additionally based on a cache of rendered words, wherein rendering the document including the text to the display comprises:
 if a word being rendered at a location in the document matches a rendered word in the cache:
  moving the rendered word to the location if the rendered word has not already been used; or
  copying the rendered word to the location if the rendered word has already been used; or
 if the word being rendered at the location in the document does not match any rendered words in the cache, rendering each character of the word according to a corresponding font file.

8. The method of claim 7, wherein rendering each character of the word according to a corresponding font file comprises:
 if the character has not been rendered before, generating from the font file a JavaScript function for rendering the character and executing the JavaScript function; or
 if the character has been rendered before, executing the JavaScript function for rendering the character.

9. The method of claim 1, further comprising, downloading from a server a first font file from a plurality of font files that collectively define how each character of a font should be rendered, each of the font files including a different range of characters of the font, wherein rendering the document including the text to the display comprises:
 if a character being rendered is included in a first range of characters included in the first font file, rendering the character according to the first font file; or
 if the character being rendered is absent from the first range of characters:
  requesting from the server a second font file including a second range of characters that includes the character being rendered;
  receiving the second font file; and
  rendering the character according to the second font file.

10. The method of claim 1, wherein the method is performed by a browser on a client device.

11. The method of claim 1, wherein the method is performed by a mobile app on a mobile device.

12. A non-transitory computer storage medium having computer instructions stored thereon that are executable by a computing device to perform operations comprising:
 storing text for a document in a storage format, wherein storing text in a storage format comprises storing text as plain text in the storage format and storing a markup of the plain text in the storage format separate from the plain text, the markup being indexed into the plain text;
 generating a render format from the storage format, wherein generating a render format from the storage format comprises:
  breaking the plain text into blocks based on logical separation points in the plain text;
  within each block, breaking the plain text into separate words; and
  for each word, identifying a style applied to the word based on the markup;
 generating metrics describing the render format, wherein generating metrics describing the render format comprises:
  determining a size of each character in each word;
  adding a size object to each word in the render format, the size object including the determined size of each character in the word;
  determining a size of each word; and
  adding line metrics to the render format, the line metrics including the size of each word and, for each word, the line metrics pointing to a location in the document where the word will be rendered based on the size of the word, available space in the document for text, and any obstacles in the document; and
 rendering the document including the text to a display based at least on the generated metrics.

13. The non-transitory computer storage medium of claim 12, wherein:
 the document includes multiple text areas including a first text area linked to a second text area;
 the line metrics further include one or more leftover words that were in the first text area prior to a change in the first text area that results in the leftover words no longer fitting in the first text area; and
 as the document is rendered, the leftover words are moved to the second text area.

14. The non-transitory computer storage medium of claim 12, wherein the document includes an obstacle and the operations further comprise:
 after rendering the document, receiving input effective to move the obstacle from a first location to a second location; and
 reflowing the text around the obstacle substantially in real time as the obstacle is moved from the first location to the second location.

15. The non-transitory computer storage medium of claim 14, wherein the operations further comprise, prior to receiving the input effective to move the obstacle from the first location to the second location, caching the blocks, words, and added size objects of the render format in a cache, wherein the text reflows around the obstacle substantially in real time as the obstacle is moved from the first location to the second location by substantially continuously performing the following while the object is being moved from the first location to the second location:

determining that the storage format from which the render format is generated is unchanged;

generating a new render format from the cache without breaking the plain text from the storage format into blocks and words a second time;

generating second metrics describing the new render format without determining a size of each character in each word a second time and without adding a size object to each word a second time, including adding line metrics pointing to locations in the document where words will be rendered based on a size of each of the words, available space in the document, and a current location of the obstacle; and rendering the document including the text and the obstacle to the display based at least on the generated second metrics.

16. The non-transitory computer storage medium of claim 12, wherein the operations further comprise receiving input effective to specify a transformation of a portion of the text, wherein each character of text is specified by a font file and rendering the document including the text to the display includes applying the transformation to each of multiple points of each character of the portion of the text, the multiple points of each character being specified by the font file.

17. The non-transitory computer storage medium of claim 12, wherein rendering the document based at least on the generated metrics is additionally based on a cache of rendered words, wherein rendering the document including the text to the display comprises:

if a word being rendered at a location in the document matches a rendered word in the cache:
moving the rendered word to the location if the rendered word has not already been used; or
copying the rendered word to the location if the rendered word has already been used; or if the word being rendered at the location in the document does not match any rendered words in the cache, rendering each character of the word according to a corresponding font file.

18. The non-transitory computer storage medium of claim 12, wherein the operations further comprise downloading from a server a first font file from a plurality of font files that collectively define how each character of a font should be rendered, each of the font files including a different range of characters of the font, wherein rendering the document including the text to the display comprises:

if a character being rendered is included in a first range of characters included in the first font file, rendering the character according to the first font file; or if the character being rendered is absent from the first range of characters:
requesting from the server a second font file including a second range of characters that includes the character being rendered;
receiving the second font file; and
rendering the character according to the second font file.

19. A system comprising:
a processor; and
a non-transitory computer storage medium having computer instructions stored thereon that are executable by the processor to perform operations comprising:
storing text for a document in a storage format, wherein storing text in a storage format comprises storing text as plain text in the storage format and storing a markup of the plain text in the storage format separate from the plain text, the markup being indexed into the plain text;
generating a render format from the storage format, wherein generating a render format from the storage format comprises:
breaking the plain text into blocks based on logical separation points in the plain text;
within each block, breaking the plain text into separate words; and
for each word, identifying a style applied to the word based on the markup;
generating metrics describing the render format, wherein generating metrics describing the render format comprises:
determining a size of each character in each word;
adding a size object to each word in the render format, the size object including the determined size of each character in the word;
determining a size of each word; and
adding line metrics to the render format, the line metrics including the size of each word and, for each word, the line metrics pointing to a location in the document where the word will be rendered based on the size of the word, available space in the document for text, and any obstacles in the document; and
rendering the document including the text to a display based at least on the generated metrics.

20. The system of claim 19, wherein the system is a desktop computer.

21. The system of claim 19, wherein the system is a mobile device.

* * * * *